United States Patent
Sato

(10) Patent No.: US 9,290,106 B2
(45) Date of Patent: Mar. 22, 2016

(54) POWER CONTROL SYSTEM OF HYBRID VEHICLE

(71) Applicant: TOYOTA JIDOSHA KABUSHIKI KAISHA, Toyota-shi, Aichi-ken (JP)

(72) Inventor: Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/691,671

(22) Filed: Apr. 21, 2015

(65) Prior Publication Data

US 2015/0321573 A1 Nov. 12, 2015

(30) Foreign Application Priority Data

May 8, 2014 (JP) ................................. 2014-096834

(51) Int. Cl.
*B60W 10/06* (2006.01)
*B60L 11/18* (2006.01)
*B60W 10/08* (2006.01)

(52) U.S. Cl.
CPC ............ *B60L 11/1851* (2013.01); *B60W 10/06* (2013.01); *B60W 10/08* (2013.01); *B60W 2510/06* (2013.01); *B60W 2510/08* (2013.01); *B60W 2710/242* (2013.01); *Y10S 903/903* (2013.01)

(58) Field of Classification Search
USPC .......................................................... 701/22
See application file for complete search history.

(56) References Cited

U.S. PATENT DOCUMENTS

| 8,547,043 B2* | 10/2013 | Kuroda ................ B62D 5/0481 318/400.21 |
| 8,958,951 B2* | 2/2015 | Mikamo ............... B62D 5/0463 701/41 |
| 2006/0005736 A1* | 1/2006 | Kumar ................ B60L 11/1801 105/1.4 |
| 2009/0073726 A1* | 3/2009 | Babcock ............... H02M 7/497 363/20 |
| 2010/0270976 A1* | 10/2010 | Tamura ................... B60L 11/14 320/136 |
| 2012/0021263 A1* | 1/2012 | Nishi .................. B60L 11/1851 429/62 |
| 2012/0112695 A1* | 5/2012 | Nishi .................... B60L 3/0046 320/109 |

FOREIGN PATENT DOCUMENTS

JP 2010-259217 11/2010

* cited by examiner

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

A power control system includes a battery, a converter which converts a direct-current voltage of the battery to a different level of direct-current voltage by the switching of switching elements, a second inverter, a second MG which is an electric motor, an engine, and an ECU which is a controller. When there is a warm-up request for the battery, the ECU causes a carrier frequency in the switching control of the switching elements to be lower than a carrier frequency in the case where there is no warm-up request for the battery. When there is a warm-up request, the ECU causes the carrier frequency at which the engine is in operation to be lower than the carrier frequency at which the engine is out of operation.

4 Claims, 4 Drawing Sheets

POWER CONTROL SYSTEM OF HYBRID VEHICLE

CROSS-REFERENCE TO RELATED APPLICATIONS

This application claims priority to Japanese Patent Application No. 2014-096834, filed on May 8, 2014, the entire disclosure of which is incorporated herein by reference.

TECHNICAL FIELD

The present invention relates to a power control system of a hybrid vehicle. More specifically, it relates to the control of a carrier frequency in switching control of a converter.

BACKGROUND ART

There has been known a hybrid vehicle which is equipped with an electric motor and an engine and which runs using at least one of the electric motor and the engine as a driving source. The hybrid vehicle may step up a direct-current voltage of a battery which is a secondary battery using a converter and then supply the voltage to an inverter, and convert the voltage to alternating-current electric power using the inverter and then supply the electric power to the electric motor.

According to Patent Literature 1, when there is a battery warm-up request, a carrier frequency used for switching control of the converter is made lower than that in the case where there is no battery warm-up request to increase a ripple current which is a current pulsation flowing through a reactor of the converter so that the warm-up of the battery connected to the reactor will be accelerated.

CITATION LIST

Patent Literature

Japanese Patent Application Publication No. 201.0-259217

SUMMARY OF INVENTION

Technical Problem

In the configuration described in Patent Literature 1, the carrier frequency for the switching control of the converter becomes lower during the warm-up of the battery, so that noise including electromagnetic noise may increase in a circuit including the battery and the converter due to the increase of the amplitude of the ripple current. As a result, vehicle passengers may feel uncomfortable. In particular, in the case of EV running in which the vehicle runs using the electric motor as the driving source with the engine stopped, engine noise is eliminated from the noise that is audible to the passengers, and noise based on the ripple current becomes resultantly easier to hear, so that the passengers may feel more uncomfortable.

An object of the present invention is to provide a power control system of a hybrid vehicle which can accelerate the temperature rise of a battery when there is a battery warm-up request and which can suppress an increase in passenger's discomfort.

Means for Solving the Problems

A power control system of a hybrid vehicle in connection with the present invention comprises a battery; a converter which converts a direct-current voltage of the battery to a different level of direct-current voltage by the switching of switching elements and then outputs the converted voltage; an inverter which converts an output of the converter to an electric motor driving current; an electric motor which is driven by the electric motor driving current from the inverter; a controller which, when there is a warm-up request for the battery, causes a carrier frequency in the switching control of the switching elements to be lower than a carrier frequency in the case where there is no warm-up request for the battery; and an engine, wherein the hybrid vehicle runs using at least one of the electric motor and the engine as a driving source, and when there is a warm-up request, the controller causes the carrier frequency at which the engine is in operation to be lower than the carrier frequency at which the engine is out of operation.

Advantage of the Invention

A power control system of a hybrid vehicle according to the present invention can accelerate the temperature rise of a battery when there is a battery warm-up request and can suppress an increase in passenger's discomfort.

DETAILED DESCRIPTION OF THE EMBODIMENTS

Figure 1:
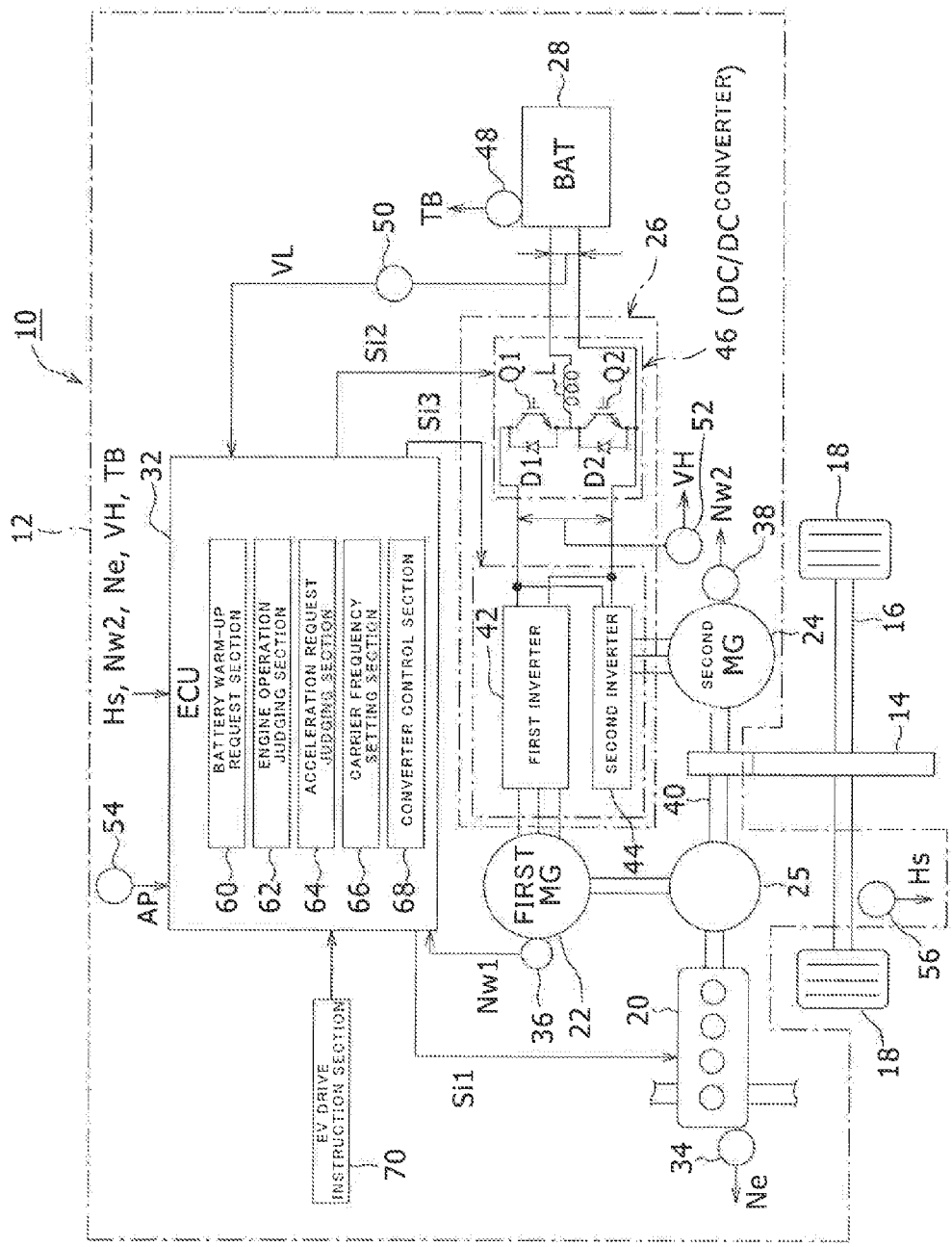
FIG. 1 is a diagram showing the general configuration of a hybrid vehicle equipped with a power control system according to an embodiment of the present invention.

An embodiment according to the present invention will be described below with reference to the drawings. Although a motor generator having the function of an electric motor and the function of an electric power generator is described below as an electric motor, the electric motor need not have the function of the electric power generator. Although a step-up converter having step-up/step-down functions is used as a converter in the case described below, a converter simply having the step-up function alone may be used. Components similar to those in FIG. 1 are described below with reference to the same reference numerals.

FIG. 1 shows the general configuration of a hybrid vehicle 10 equipped with a power control system 12 according to the embodiment. The hybrid vehicle 10 comprises the power control system 12, a decelerator 14, and drive wheels (e.g. front wheels) 18 coupled to a drive shaft 16. The power control system 12 further includes an engine 20, a first motor generator 22, a second motor generator 24, a power dividing mechanism 25, a PCU (Power Control Unit) 26, a battery 28, and an ECU (Electronic Control Unit) 32 which is a controller. The hybrid vehicle 10 runs using at least one of the engine 20 and the second motor generator 24 as a driving source.

Hereinafter, the first motor generator 22 is referred to as the first MG22, and the second motor generator 24 is referred to as the second MG24.

In accordance with a control signal Si1 from the ECU 32, fuel supply or the like is controlled so that driving of the engine 20 is controlled. An engine rotation speed sensor 34 to detect a rotation speed Ne of a crankshaft is attached to the engine 20. In the present specification, the "rotation speed" means a rotation speed per unit time, for example, per minute.

The first MG22 is electrically connected to the battery 28, and is a three-phase synchronous electric power generator having an electric power generation function which generates electric power when basically driven by the engine 20. The first MG22 also has a motor function to start the engine 20. When the first MG22 is used as the electric power generator, at least some of torque from the engine 20 is transmitted to a rotary shaft of the first MG22 via the later-described power dividing mechanism 25. Electric power generated by the first MG22 is supplied to the battery 28 via the PCU 26, and the battery 28 is charged. A first rotation sensor 36 which detects a rotation angle or a rotation speed Nw1 of the rotary shaft of the first MG22 is attached to the first MG22.

The second MG24 is electrically connected to the battery 28, is basically used as a traveling motor, and is a three-phase synchronous motor which is driven by electric power supplied from the battery 28. If the second MG24 is driven, the drive wheels 18 are driven, and driving force of the vehicle is generated. The second MG24 also has the function as an electric power generator for electric power regeneration to perform regenerative braking in vehicle deceleration. Electric power generated by the second MG24 is also supplied to the battery 28 via the PCU 26, and the battery 28 is charged. A second rotation sensor 38 which detects a rotation angle or a rotation speed Nw2 of the rotary shaft of the second MG24 is attached to the second MG24. Induction motors or some other electric motors may be used as the first MG and the second MG.

Signals indicating the detection values Ne, Nw1, and Nw2 of the engine rotation speed sensor 34, the first rotation sensor 36, and the second rotation sensor 38 are sent to the ECU 32. The ECU 32 calculates the rotation speeds Nw1 and Nw2 when receiving the detection values of the rotation angles.

The power dividing mechanism 25 is composed of a planetary gear mechanism. For example, the planetary gear mechanism includes a sun gear, a plurality of pinion gears, a carrier, and a ring gear. The sun gear is coupled to the end of the hollow rotary shaft of the first MG22. The pinion gears are in mesh with both the ring gear and the sun gear, and are connected to a drive shaft of the engine 20 via the carrier. Each of the pinion gears is coupled to the end of the carrier so as to be able to rotate on its axis and rotate around the central axis of the carrier. The ring gear is connected to an output shaft 40, and the output shaft 40 is coupled to the rotary shaft of the second MG24. The output shaft 40 may be coupled to the rotary shaft of the second MG24 via a deceleration mechanism including another unshown planetary gear mechanism. The output shaft 40 is connected, via the decelerator 14, to the drive shaft 16 coupled to the drive wheels 18. The power dividing mechanism 25 divides the power from the engine 20 into a path to the output shaft 40 and a path to the first MG22.

The PCU 26 is electrically connected between the first MG22, the second MG24, and the battery 28. The PCU 26 includes a first inverter 42, a second inverter 44, and a converter 46 which is a DC/DC converter. The converter 46 is controlled by a control signal Si2 from the ECU 32, and each of the inverters 42 and 44 is controlled by a control signal Si3 from the ECU 32. The converter 46 includes two switching elements Q1 and Q2 connected on an upper arm and a lower arm, two diodes 1D and D2 connected in parallel to the switching elements Q1 and Q2 so as to pass opposite electric currents therethrough, and a reactor L having one end connected between the switching elements Q1 and Q2. Transistors such as IGBTs are used as the switching elements Q1 and Q2. The converter 46 is connected between the battery 28 and the inverters 42 and 44. The converter 46 has the function to step up a direct-current voltage VL input from the battery 28 by the switching of the switching elements Q1 and Q2 to convert the direct-current voltage VL to a different level of direct-current voltage and then output a stepped-up direct-current voltage VH to the inverters 42 and 44, when controlled under a step-up instruction by the ECU 32. The converter 46 also has the function to step down the direct-current voltage on the output side (voltage VH side) and then output the direct-current voltage VL to the battery 28, when controlled under a step-down instruction by the ECU 32. As a result, the battery 28 is charged.

The first inverter 42 converts the direct-current voltage VH input from the converter 46 to an alternating-current voltage and then outputs the alternating-current voltage to the first MG22, and drives the first MG22. In this case, the first inverter 42 converts the output current of the converter 46 to a drive current of the first MG22. The first MG22 is driven by the drive current from the first inverter 42. The first inverter 42 also has the function to convert, to a direct-current voltage, an alternating-current voltage obtained when the first MG22 has generated electricity in response to the driving of the engine 20, and output the direct-current voltage to the converter 46.

The second inverter 44 converts the direct-current voltage VH input from the converter 46 to an alternating-current voltage and then outputs the alternating-current voltage to the second MG24, and drives the second MG24. In this case, the second inverter 44 converts the output current of the converter 46 to a drive current of the second MG24. The second MG24 is driven by the drive current from the second inverter 44. The second inverter 44 also has the function to convert an alternating-current voltage generated during the regenerative braking of the hybrid vehicle 10 to a direct-current voltage, and output the direct-current voltage to the converter 46.

The first inverter 42 and the second inverter 44 each include switching elements respectively provided in upper and lower arms of U, V, and W phases, and the switching of each of the switching elements is controlled by the control signal Si2 from the ECU 32. The three-phase upper and lower arms of the first inverter 42 are electrically connected to input terminals of the first MG22 of the respective phases by power lines, and an unshown first motor current sensor for detecting a motor current is attached to the two—phase or three-phase power lines. An unshown second motor current sensor is also attached to two-phase or three-phase power lines which connect the second inverter 44 to the second MG24. A signal indicating the detection value of each of the motor current sensors is sent to the ECU 32.

The battery 28 is a secondary battery which is a nickel-metal-hydride battery or a lithium-ion battery or some other type. An unshown system relay is provided between the battery 28 and the converter 46, and the on/off operation of the system relay is controlled by the ECU 32. Smoothing condensers may be respectively connected between the converter 46 and the battery 28 and between the converter 46 and each of the inverters 42 and 44. A battery temperature sensor 48 detects a temperature TB of the battery 28, and sends a signal indicating the detected temperature TB to the ECU 32. A battery current sensor and a battery voltage sensor that are not shown are respectively provided to detect an output current and an output voltage of the battery 28, and signals indicating the detection values of the battery current sensor and the battery voltage sensor are sent to the ECU 32.

A voltage sensor 50 detects the low-voltage-side voltage VL of the converter 46, and sends a signal indicating the voltage VL to the ECU 32. A voltage sensor 52 detects the high-voltage-side voltage VH of the converter 46, and sends a signal indicating the high-voltage-side voltage VH to the ECU 32.

An accelerator position sensor 54 detects an accelerator position AP of an accelerator pedal, and sends a signal indicating the accelerator position AP to the ECU 32. A drive wheel rotation sensor 56 detects a rotation angle or a rotation speed Hs of the drive wheels 18, and sends a signal indicating the rotation speed Hs to the ECU 32. The ECU 32 calculates an estimated vehicle speed on the basis of the rotation speed Hs. The ECU 32 may alternatively calculate the estimated vehicle speed on the basis of the rotation angle of the second MG24 or the detection value of the rotation speed Nw2. The ECU 32 may alternatively calculate the vehicle speed by using the detection value of an unshown rotation sensor for detecting a rotation angle or a rotation speed Vs of driven wheels (e.g. rear wheels).

The ECU 32 includes a microcomputer having a CPU and a memory. Although one ECU 32 is only shown as the ECU 32 in the example shown, the ECU 32 may be properly divided into components which are electrically connected to one another by a signal cable. The ECU 32 has a battery warm-up request section 60, an engine operation judging section 62, an acceleration request judging section 64, a carrier frequency setting section 66, and a converter control section 68. The converter control section 68 controls the switching operation of switching elements of the converter 46 on the basis of the set frequency set by the carrier frequency setting section 66. The ECU 32 also controls the operations of the inverters 42 and 44. The battery warm-up request section 60, the engine operation judging section 62, the acceleration request judging section 64, and the carrier frequency setting section 66 will be described later.

During traveling drive control, the ECU 32 calculates vehicle desired torque Tr* and an engine desired output Pe* on the basis of the accelerator position AP or the vehicle speed and the accelerator position AP, and calculates a desired rotation speed Ne* and desired toque Te* of the engine 20 from a preset map. The ECU 32 calculates a desired rotation speed Nw1* and desired toque Tr1* of the first MG22 and desired toque Tr2* of the second MG24 from the desired rotation speed Ne*, the rotation speed Nw2 of the second MG24, and the rotation speed Nw1 of the first MG22. The desired rotation speed Ne*, the desired toque Te*, the desired rotation speed Nw1*, the desired toque Tr1*, and the desired toque Tr2* may be derived from a map previously stored in an unshown storage unit on the basis of the accelerator position AP or the accelerator position AP and the vehicle speed.

The ECU 32 controls the engine 20 in accordance with the control signal Si1 so that the calculated desired rotation speed Ne* and desired toque Te* of the engine 20 will be achieved. The ECU 32 controls the converter 46 and the inverters 42 and 44 using the converter control section 68 and an unshown inverter control section of the ECU 32 in accordance with the control signals Si2 and Si3 so that the calculated desired rotation speed Nw1* and desired toque Tr1* of the first MG22 and the desired toque Tr2* of the second MG24 will be achieved.

In this case, the ECU 32 calculates a desired voltage VH* which is an input voltage of each of the inverters 42 and 44 and which is an output voltage of the converter 46 on the basis of the desired toques Tr1* and Tr2*, the desired rotation speed Nw1*, and the rotation speed Nw2. For example, the desired voltage VH* may be a higher one of the voltages respectively required in the inverters 42 and 44. The converter 46 controls the switching of the switching elements Q1 and Q2 so that the voltage detection value VH may correspond to the desired voltage VH*. In this case, if one switching element Q1 (or Q2) of the switching elements Q1 and Q2 is turned on, the other switching element Q2 (or Q1) is turned off. This operation is repeated so that the switching elements are alternately turned on and off in reverse via a dead time at which both the switching elements are turned off. In this case, as will be described later with reference to S2, the ECU 3 generates a control signal on the basis of the carrier frequency which is the frequency of carrier waves and a duty ratio, and drives the switching elements Q1 and Q2 by the control signal in the converter 46, the voltage VH increases if the on-duty of the switching element Q2 in the lower arm is increased, and the voltage VH decreases if the on-duty of the switching element Q1 in the upper arm is increased.

The ECU 32 calculates a state of charge (SOC) which is a charge amount of the battery 28 on the basis of the detection value from one or both of the unshown battery current sensor and battery voltage sensor. The calculation value of the SOC is used to control the switching of an EV mode and an HV mode.

The ECU 32 controls the engine 20, the first MG22, and the second MG24 so as to drive the vehicle while switching the mode between the EV mode, which is an EV driving mode, and the HV mode. The "EV mode" is a mode in which the second MG24 is driven with the engine stopped and the second MG24 is used as a driving source to drive the vehicle. The "HV mode" is a mode in which at least the engine 20 is driven to drive the vehicle. In this case, the first MG22 generates electricity by the driving of the engine 20. The EV mode and the HV mode are switched in accordance with whether a preset given condition is satisfied. For example, the mode is switched to the HV mode when the calculation value of the SOC becomes a predetermined lower limit value or less during the execution of the EV mode. During the execution of the HV mode, a driver operates an EV drive instruction section 70, and when the EV mode is selected, the mode is switched to the EV mode on the condition that a predetermined EV mode prerequisite is satisfied. During the execution of the HV mode, the mode is also switched to the EV mode when the calculation value of the SOC becomes a predetermined upper limit value or more. The EV drive instruction section 70 is, for example, a push button or a switch for indicating the EV mode. When turned on by a user, the EV drive instruction section 70 sends a signal indicating this operation to the ECU 32.

When there is a battery warm-up request, the ECU 32 sets the carrier frequency of the converter 46 to one of frequencies F1, F2, F3, and F4 which is lower than a carrier frequency FA in the case where there is no battery warm-up request. Specifically, the battery warm-up request section 60 issues a battery warm-up request when a predetermined battery warm-up request condition is satisfied. For example, when the battery temperature TB is less than a preset predetermined temperature T0 (TB<T0) and when a Preset predetermined battery warm-up requisite is satisfied, the battery warm-up request section 60 issues a battery warm-up request. The "battery warm-up requisite" is satisfied, for example, when the SOC in the battery 28 is the predetermined lower limit value or more, when the battery voltage VL is within a predetermined range, and when the detected temperature of an unshown temperature sensor for detecting the temperature of each of the inverters 42 and 44 is a predetermined temperature or less. The "battery warm-up requisite" is not satisfied otherwise.

The engine operation judging section 62 judges whether the engine 20 is "in operation" or "out of operation". In this judgment, a detection value Ne of the engine rotation speed sensor 34 sent to the ECU 32 is used to judge that the engine 20 is "out of operation" if the engine rotation speed Ne is 0, or judge that the engine 20 is "in operation" otherwise.

The acceleration request judging section 64 judges whether there is a preset "acceleration request" of the hybrid vehicle 10. For example, in the hybrid vehicle 10, the vehicle speed is determined by the rotation speed Nw2 of the second MG24, so that the acceleration request judging section 64 judges that there is an acceleration request when an increase $\Delta$Nw2 of the rotation speed Nw2 of the second MG24 per unit time $\Delta$t is a preset predetermined value K or more ($\Delta$Nw2/$\Delta$t$\geq$K), or the acceleration request judging section 64 judges that there is no acceleration request otherwise. As another example, the acceleration request judging section 64 may judge that there is an acceleration request when the press amount of the accelerator pedal per unit time $\Delta$t is a predetermined value or more in accordance with the detection value of the accelerator position sensor 54, or the acceleration request judging section 64 may judge that there is no acceleration request otherwise. As another example, the vehicle speed calculated from the detection value of the drive wheel rotation sensor 56 or the detection value of a vehicle speed sensor may be used to judge that there is an acceleration request when an increase of the vehicle speed per unit time $\Delta$t is a predetermined value or more, or judge that there is no acceleration request otherwise.

The carrier frequency setting section 66 sets the carrier frequency of the converter 46 on the basis of whether there is a warm-up request for the battery 28, an engine operation state, and whether there is an acceleration request at present. Specifically, the carrier frequency setting section 66 sets so that the carrier frequencies F1, F2, F3, and F4 in the case where there is a warm-up request for the battery 28 may be lower than the normal frequency FA which is a carrier frequency in the case where there is no warm-up request for the battery 28 (F1, F2, F3, F4<FA). The normal frequency FA will be the carrier frequency after the completion of the battery warm-up if the battery 28 is warmed up only once.

When there is a warm-up request for the battery 28, the carrier frequency setting section 66 sets so that the carrier frequencies F1 and F2 when the engine 20 is in operation may be lower than the carrier frequencies F3 and F4 when the engine 20 is out of operation (F1, F2, F3, F4). Thus, as will be described later, the temperature rise of the battery 28 can be accelerated when there is a warm-up request for the battery 28, and an increase in vehicle passenger's discomfort can be suppressed.

Furthermore, if there is a warm-up request for the battery 28 and if the engine 20 is in operation, the carrier frequency setting section 66 sets so that the carrier frequency F1 in the case where there is a vehicle acceleration request may be lower than the carrier frequency F2 in the case where there is no vehicle acceleration request (F1<F2). If there is a warm-up request for the battery 28 and if the engine 20 is out of operation, the carrier frequency setting section 66 sets so that the carrier frequency F3 in the case where there is a vehicle acceleration request may be lower than the carrier frequency F4 in the case where there is no vehicle acceleration request (F3<F4).

The converter control section 68 controls the switching of the switching elements Q1 and Q2 of the converter 46 on the basis of the carrier frequency set by the carrier frequency setting section 66, the detected voltage VH, and the desired voltage VH*.

Figure 2:
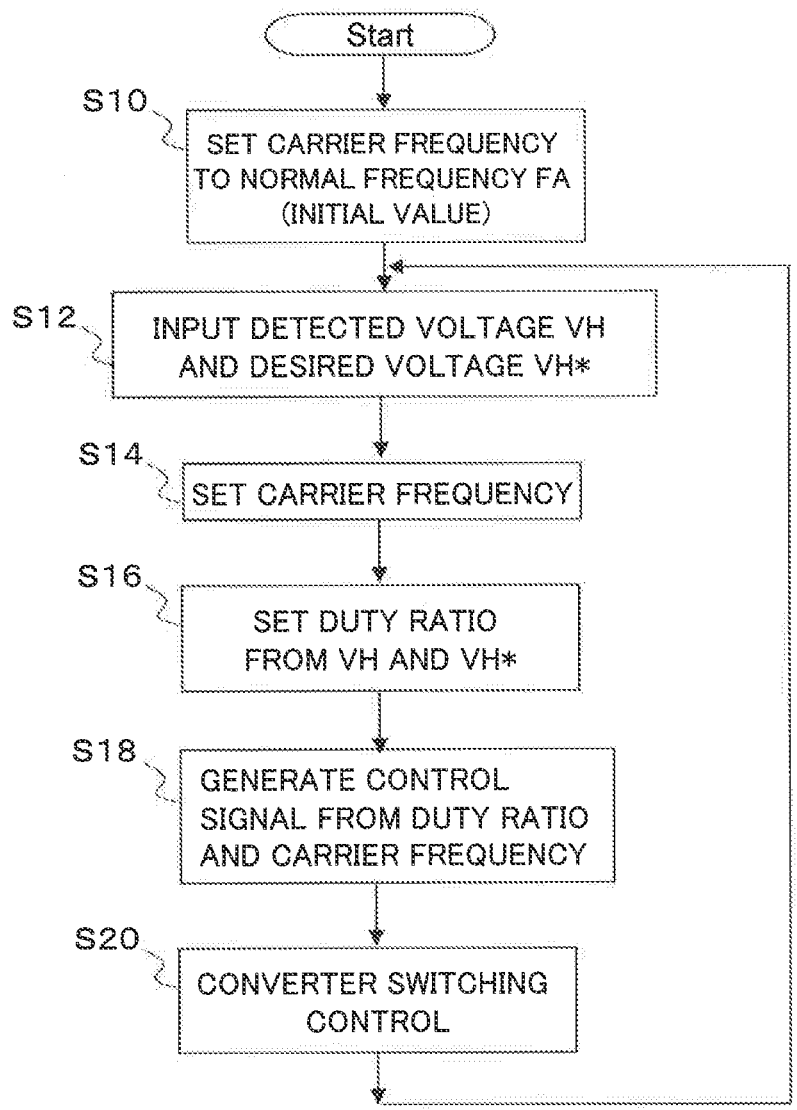
FIG. 2 is a flowchart showing a switching control method of a converter according to the embodiment of the present invention.
Figure 3:
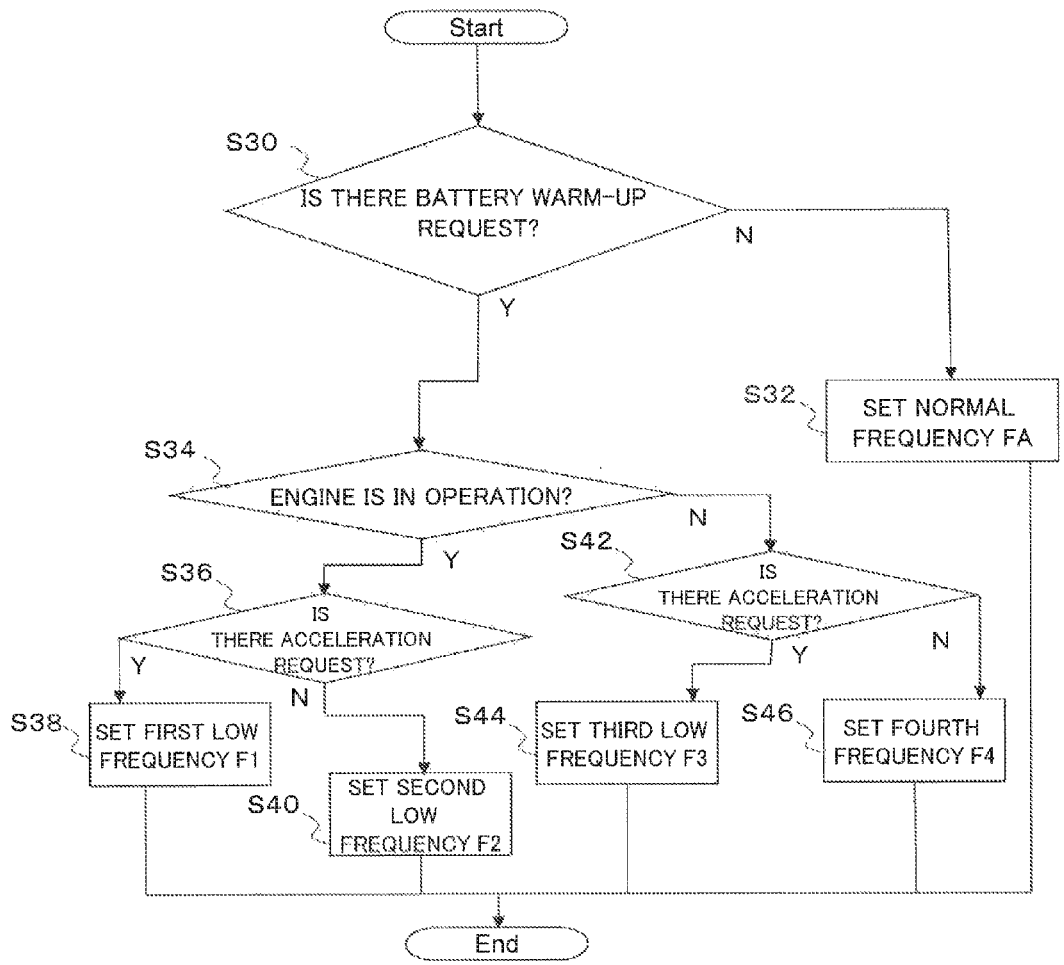
FIG. 3 is a flowchart showing a setting method in carrier frequency setting in FIG. 2.

FIG. 2 is a flowchart showing a converter control method during the traveling drive control using the power control system 12 according to the present embodiment. FIG. 3 is a flowchart showing a setting method in carrier frequency setting in FIG. 2.

In step S10, the ECU 32 sets the normal frequency FA as an initial value for the carrier frequency. In step S12, the detected voltage VH and the desired voltage VH* are then input to the ECU 32. Step "S" will be hereinafter briefly referred to as "S". In S14, the carrier frequency is set by the carrier frequency setting section 66. The setting of the carrier frequency will be described later with reference to FIG. 3.

If the carrier frequency is set in S14, a duty ratio used for the switching control of the converter 46 is set from the detected voltage VH and the desired voltage VH* in S16, and a control signal is generated from the duty ratio and the carrier frequency (S18). In S20, the converter control section 68 outputs a control signal to the converter 46 on the basis of the above control signal, controls the switching of the converter 46, and returns to S12 every predetermined control period to repeat processing.

Now, a method of setting the carrier frequency is described with reference to FIG. 3. In the carrier frequency setting, one carrier frequency is set from among a total of five carrier frequencies, namely the first, second, third, and fourth frequencies F1, F2, F3, and F4, and the normal frequency FA. The carrier frequencies are set in ascending order of F1, F2, F3, F4, and FA (F<F2<F3<F4<FA). The normal frequency FA is a frequency out of the human audio-frequency range, for example, 20 kHz or more. The first, second, third, and fourth frequencies F1, F2, F3, and F4 are frequencies within the audio-frequency range, for example, 15 kHz or less. The normal frequency FA may be, for example, 10 kHz within the audio-frequency range, and the first, second, third, and fourth frequencies F1, F2, F3, and F4 may be lower than 10 kHz.

First, the carrier frequency setting section 66 judges whether the battery warm-up request section 60 has issued a battery warm-up request, and thereby judges whether there is a battery warm-up request (S30).

When it is judged in S30 that there is no battery warm-up request, the normal frequency FA is set as the carrier frequency in S32. On the other hand, when there is a battery warm-up request in S30, the carrier frequency setting section 66 uses the engine operation judging section 62 in S34 to judge whether the engine 20 is in operation or out of operation. When it is judged in S34 that the engine 20 is in operation, the carrier frequency setting section 66 uses the acceleration request judging section 64 in S36 to judge whether there is a vehicle acceleration request. When it is judged in S36 that there is an acceleration request, the carrier frequency is set to the minimum first low frequency F1 among the five carrier frequencies F1, F2, F3, F4, and FA (S38). When there is no acceleration request, the carrier frequency is set to the second low frequency F2 higher than the first low frequency F1 (F2>F1) (S40). For example, when the carrier frequency up to the present is the normal frequency FA, the carrier frequency is changed to the first low frequency F1 or the second low frequency F2 in S38 or S40.

On the other hand, when it is judged in S34 that the engine 20 is out of operation, the carrier frequency setting section 66 uses the acceleration request judging section 64 in S42 to judge whether there is an acceleration request. When there is an acceleration request, the carrier frequency is set to the third low frequency F3 higher than the second low frequency F2

(F3>F2) (S44). When it is judged in S42 that there is no acceleration request, the carrier frequency setting section 66 sets the carrier frequency to the fourth low frequency F4 higher than the third low frequency F3 (F4>F3) (S46).

After the carrier frequencies are set in S38, S40, S44, S46, and S32, the procedure returns to S14 in FIG. 2, and the processing in S14 to S20 is performed so that the switching of the converter 46 is controlled.

Figure 4:
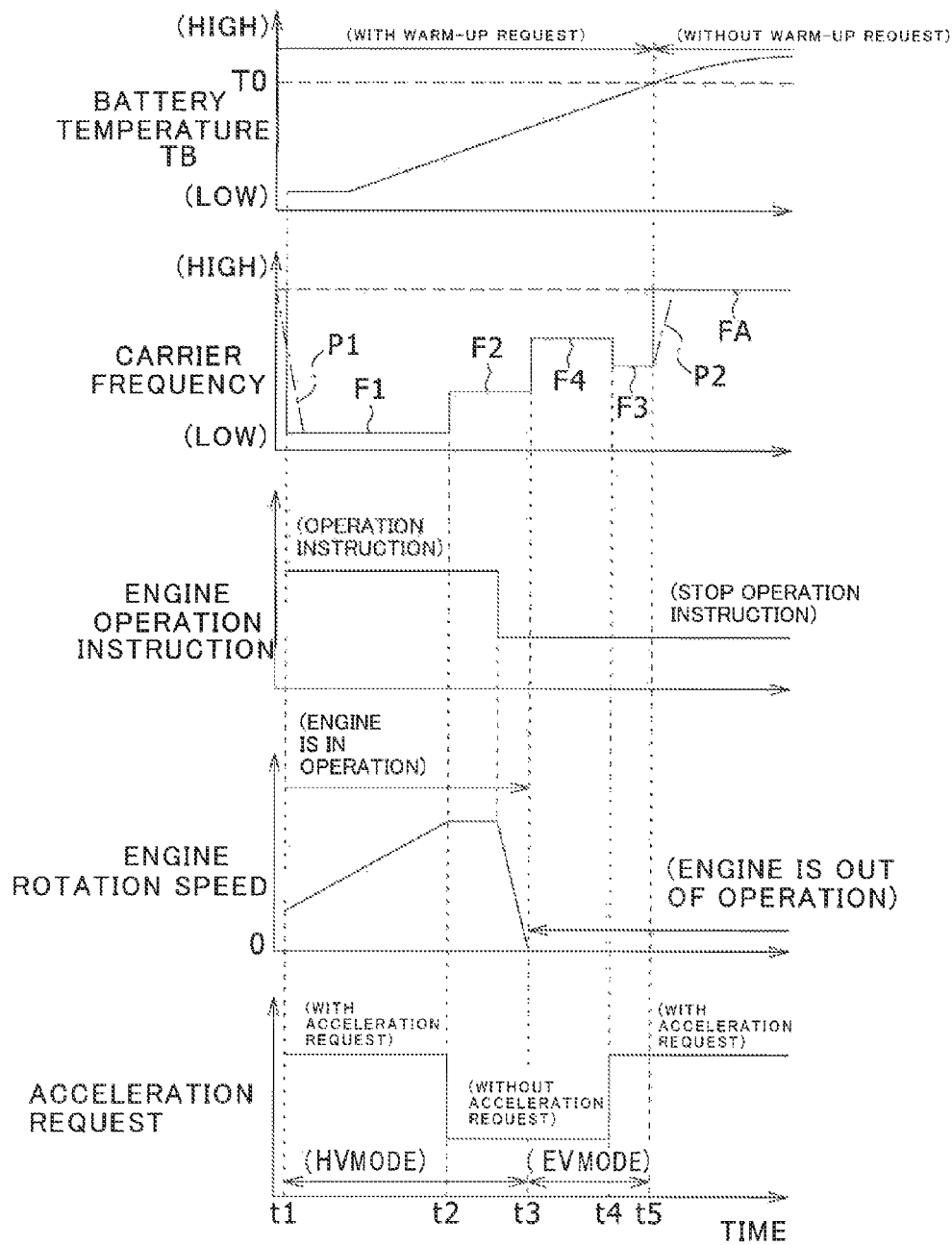
FIG. 4 is a graph showing an example of changes with time in battery temperature, the carrier frequency of the converter, engine operation instructions, engine rotation speed, and whether there is an acceleration request when the temperature of a battery is increased according to the embodiment of the present invention.

FIG. 4 shows an example of changes with time in the battery temperature TB, the carrier frequency of the converter 46, engine operation instructions, engine rotation speed, and whether there is an acceleration request when the temperature of the battery 28 is increased, according to the embodiment. The "HV mode" in which the engine 20 is operated is performed from a time t1 to a time t3. The "EV mode" in which the operation of the engine 20 is stopped and in which the vehicle is driven by the second MG24 is performed from the time t3 to a time t5. First, the normal frequency FA is set in an initial condition at the start of operation. However, if the battery temperature TB is lower than the predetermined temperature T0, the battery warm-up prerequisite is satisfied, so that a "battery warm-up request" is issued. When the driver operates the accelerator pedal, an engine operation instruction is issued, the engine rotation speed rises, and the vehicle starts to move. If it is then judged that there is a vehicle acceleration request, the carrier frequency is set to the first low frequency F1 at the time t1.

If it is then judged at the time t2 that there is no vehicle acceleration request because a constant operation amount of the accelerator pedal is maintained, the carrier frequency is changed to the second low frequency F2 higher than the first low frequency F1. The operation of the engine 20 is then stopped at the time t3, and if the EV driving is performed, the carrier frequency is changed to the higher fourth low frequency F4. If it is then judged at the time t4 that there is an acceleration request in the EV driving, the carrier frequency is changed to the third low frequency F3 lower than the fourth low frequency F4. The carrier frequency thus becomes lower than the normal frequency FA, so that the temperature of the battery 28 rises as will be described later, and the battery temperature TB gradually rises. The battery temperature TB then becomes the predetermined temperature T0 or more at the time t5, and there is no more battery warm-up request, so that the carrier frequency is changed to the normal frequency FA, and normal driving control of the vehicle using the normal frequency FA is performed.

According to the power control system 12 described above, when there is a warm-up request for the battery 28, the carrier frequency becomes lower than the normal frequency FA in the case where there is no warm-up request for the battery 28, so that a ripple current following the carrier frequency is generated in the current (reactor current) flowing through the reactor L, and the amplitude of the ripple current increases. The ripple current is also generated in a battery current which is an input/output current of the battery 28, and the calorific value of internal resistance of the battery 28 rises, so that the temperature of the battery 28 rises. Consequently, the temperature of the battery 28 can be raised by changing the carrier frequency from the normal frequency FA to a lower frequency, and the temperature of the battery 28 rise can be further accelerated at a lower carrier frequency.

On the other hand, when the carrier frequency is low, noise including electromagnetic noise increases in the circuits including the battery 28 and the converter 46 in accordance with the increase of the amplitude of the ripple current. When the carrier frequency is within the audio-frequency range, the percentage of persons who can hear a given frequency is higher at a lower frequency. According to the present embodiment, in view of the circumstances, the carrier frequencies F1 and F2 at which the engine 20 is in operation is set to be lower than the third and fourth low frequencies F3 and F4 at which the engine 20 is out of operation when there is a warm-up request for the battery 28. Thus, even if the noise based on the ripple current decreases in frequency and thereby becomes easier to hear, the ratio of the noise based on the increase of the ripple current to the total noise resulting from the vehicle becomes lower because of the noise of the engine 20, so that the noise caused by the ripple current does not easily become noise that is uncomfortable to the vehicle passengers.

On the other hand, the ratio of the noise based on the ripple current to the total noise resulting from the vehicle is higher when the engine 20 is out of operation, but this noise caused by the ripple current is high in frequency and therefore does not easily become noise that is uncomfortable to the vehicle passengers. For example, if the third and fourth low frequencies F3 and F4 range from 10 to 15 kHz which are relatively high in the audio-frequency range, the percentage of persons who can not hear is higher than at a lower frequency, which does not easily lead to uncomfortable noise. As a result, the temperature rise of the battery 28 can be accelerated when there is a warm-up request for the battery 28, and an increase in vehicle passenger's discomfort can be suppressed.

The carrier frequency further decreases when the engine 20 is in operation or when the vehicle is accelerating during the operation of the engine 20, so that the temperature rise of the battery 28 can be accelerated, and road noise increases due to the increase of the vehicle speed resulting from the acceleration. Therefore, the noise based on the ripple current resulting from the decrease of the carrier frequency does not easily become noise that is uncomfortable to the vehicle passengers. Moreover, the acceleration during the operation of the engine 20 increases the engine rotation speed and thus increases the noise based on engine noise, so that the ratio of the noise based on the increase of the ripple current to the total noise resulting from the vehicle becomes lower. Thus, the temperature rise of the battery 28 can be more efficiently accelerated. In the case described above, the carrier frequency is changed depending on whether there is an acceleration request both when the engine 20 is in operation and out of operation. However, the carrier frequency may be changed depending on whether there is an acceleration request only when the engine 20 is in operation or out of operation.

Although the carrier frequency is changed depending on whether there is an acceleration request in the case described above, the carrier frequency may be unchanged depending on whether there is an acceleration request. In this case, when there is a battery warm-up request and when the engine 20 is in operation, the first low frequency F1 lower than the normal frequency FA is set as the carrier frequency. When the engine 20 is out of operation, the second low frequency F2A higher than the first low frequency F1A but lower than the normal frequency (F2A>F1A) is set as the carrier frequency.

In the illustration in FIG. 4, when the carrier frequency is changed, this change is made instantaneously. In contrast, when the carrier frequency is changed, the carrier frequency may be gradually increased or decreased at a constant given increase rate or given decrease rate in a predetermined control period until the completion of the change, so that the carrier frequency may be gradually changed on each of increase and decrease sides, and the converter 46 may be controlled in each control period. In this case, for example, the carrier frequency is gradually changed from the frequency FA to the frequency F1 as indicated by a dashed line P1 in FIG. 4, and is gradually changed from the frequency F3 to the frequency FA as indicated by a dashed line P2. Although not shown, the same also applies to the changes of other frequencies.

The ECU 32 may control so as to stop the operations of the first MG22 and the second MG24 for no-load operation of the engine 20 when there is a warm-up request for the battery 28, and control the switching of the converter 46 using a carrier frequency lower than the normal frequency FA. Accordingly, the first MG22 and the second MG24 do not generate electricity during the warm-up of the battery 28, and charging the battery 28 with excessive electric power can be efficiently inhibited.

REFERENCE SIGNS LIST

10: hybrid vehicle, 12: power control system, 14: decelerator, 16: drive shaft, 18: drive wheels, 20: engine, 22: first motor generator (first MG), 24: second motor generator (second MG), 25: power dividing mechanism, 26: PCU, 28: battery, 32: ECU, 34: engine rotation speed sensor, 36: first rotation sensor, 38: second rotation sensor, 40: output shaft, 42: first inverter, 44: second inverter, 46: converter, 48: battery temperature sensor, 50, 52: voltage sensors, 54: accelerator position sensor, 56: drive wheel rotation sensor, 60: battery warm-up request section, 62: engine operation judging section, 64: acceleration request judging section, 66: carrier frequency setting section, 68: converter control section, 70: EV drive instruction section.

The invention claimed is:

1. A power control system of a hybrid vehicle, the system comprising:
    a battery;
    a converter which converts a direct-current voltage of the battery to a different level of direct-current voltage by the switching of switching elements and then outputs the converted voltage;
    an inverter which converts an output of the converter to an electric motor driving current;
    an electric motor which is driven by the electric motor driving current from the inverter;
    a controller which, when there is a warm-up request for the battery, causes a carrier frequency in the switching control of the switching elements to be lower than a carrier frequency in the case where there is no warm-up request for the battery; and
    an engine,
    wherein the hybrid vehicle runs using at least one of the electric motor and the engine as a driving source, and
    when there is a warm-up request, the controller causes the carrier frequency at which the engine is in operation to be lower than the carrier frequency at which the engine is out of operation.

2. The power control system of the hybrid vehicle according to claim 1, wherein
    when there is a warm-up request and when the engine is in operation, the controller causes the carrier frequency in the case where there is a preset acceleration request for the vehicle to be lower than the carrier frequency in the case where there is no acceleration request.

3. The power control system of the hybrid vehicle according to claim 1, wherein
    when there is a warm-up request and when the engine is out of operation, the controller causes the carrier frequency in the case where there is a preset acceleration request for the vehicle to be lower than the carrier frequency in the case where there is no acceleration request.

4. The power control system of the hybrid vehicle according to claim 2, wherein
    when there is a warm-up request and when the engine is out of operation, the controller causes the carrier frequency in the case where there is a preset acceleration request for the vehicle to be lower than the carrier frequency in the case where there is no acceleration request.

* * * * *